(12) United States Patent
Gallagher

(10) Patent No.: US 6,400,848 B1
(45) Date of Patent: Jun. 4, 2002

(54) METHOD FOR MODIFYING THE PERSPECTIVE OF A DIGITAL IMAGE

(75) Inventor: Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/281,574

(22) Filed: Mar. 30, 1999

(51) Int. Cl.[7] ............................. G06T 5/00; G06T 3/00; G06T 7/00
(52) U.S. Cl. ................. 382/254; 382/275; 382/154; 382/199; 382/286
(58) Field of Search ................................. 382/275, 254, 382/276, 286, 287, 293, 294, 154, 106, 104, 105, 199; 345/647

(56) References Cited

U.S. PATENT DOCUMENTS 5,581,637 A  * 12/1996  Cass et al. ................. 382/284
5,651,075 A     7/1997  Frazier et al. ............. 382/105
5,999,660 A  * 12/1999  Zorin et al. ................ 382/154

OTHER PUBLICATIONS

Ballard and Brown, *Computer Vision* (Prentice–Hall, Inc., Englewood Cliffs, NJ, 1982), pp. 19 & 20; and pp. 123 & 124.

* cited by examiner

Primary Examiner—Scott Rogers
(74) Attorney, Agent, or Firm—David M. Woods

(57) ABSTRACT

A method for modifying an apparent perspective of a digital image representing a perspective projection of a scene, the method comprises the steps of locating a line in the digital image; computing a correction term based on parameters of the located line which said correction term is related to the perspective of the digital image relative to the scene; and resampling the digital image based on the correction term for creating a processed image.

31 Claims, 4 Drawing Sheets

METHOD FOR MODIFYING THE PERSPECTIVE OF A DIGITAL IMAGE

FIELD OF THE INVENTION

The invention relates generally to the field of digital image processing and, more particularly, to modifying the perspective of a digital image.

BACKGROUND OF THE INVENTION

Perspective distortion is well known in photography. Traditionally, a view camera permits the photographer to avoid perspective distortion. This is accomplished by having independent control over the position of both the lens plane and the image plane. Lines in the scene that are parallel to both the lens and image planes will appear parallel on the image. A view camera permits the photographer to control the character of the distortion that occurs by projecting a three-dimensional scene onto a two-dimensional image plane.

Image warping is a well-known tool that may be used to modify the apparent perspective of an image. For example, U.S. Pat. No. 5,651,075 by Frazier et al., describes a method of compensating for the perspective distortion present in an image of a license plate captured at a known camera to subject distance. This patent describes a method of modifying the perspective by using the known relationship between the camera and the subject, which relationship is always constant.

Although the presently known and utilized method of modifying distortion is satisfactory, it is not without drawbacks. The prior art method assumes a predetermined level of perspective distortion is always present.

Consequently, a need exists for overcoming the above-described drawbacks. Most importantly, a need exists for a method which detects both the presence and level of the perspective distortion present in the image rather than assuming a certain level of perspective distortion.

SUMMARY OF THE INVENTION

The present invention is directed to overcoming one or more of the problems set forth above. Briefly summarized, according to one aspect of the present invention, the invention resides in a method for modifying an apparent perspective of a digital image representing a perspective projection of a scene, the method comprising the steps of: (a) locating a line in the digital image; (b) computing a correction term based on parameters of the located line which said correction term is related to the perspective of the digital image relative to the scene; and (c) resampling the digital image based on the correction term for creating a processed image.

The above and other objects of the present invention will become more apparent when taken in conjunction with the following description and drawings wherein identical reference numerals have been used, where possible, to designate identical elements that are common to the figures.

DETAILED DESCRIPTION OF TILE INVENTION

In the following description, the present invention will be described in the preferred embodiment as a software program. Those skilled in the art will readily recognize that the equivalent of such software may also be constructed in hardware.

Figure 1:
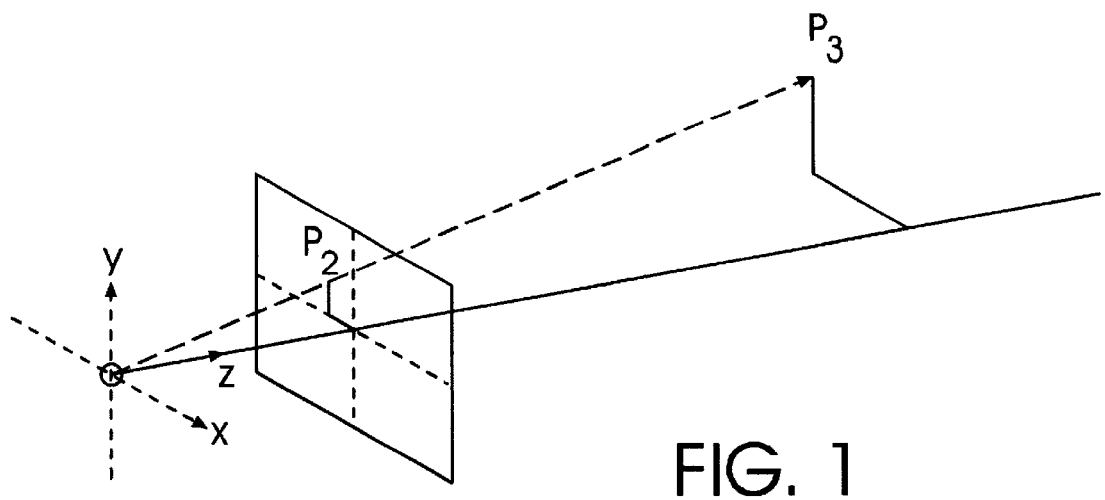
FIG. 1 is an illustration of perspective projection.

Referring to FIG. 1, there is shown a diagram illustrating perspective projection of a point in the scene to a point on the image plane. Perspective projection is the mathematical system used to describe the mapping of a three dimensional scene onto a two-dimensional image plane. Perspective projection is described in many texts, for example on pages 19–20 in Ballard and Brown in *Computer Vision* (Prentice-Hall, Inc., Englewood Cliffs, N.J., 1982.) Perspective projection may be used to map each point $P_3$ in space to a point $P_2$ in the image plane. It has long been known that the projection of lines in the scene that are parallel in the scene will be projected to lines that have a common vanishing point in the image plane. The result of this phenomena, which shall herein be referred to as perspective distortion, is that lines that were obviously parallel in the scene appear as if they will converge on the image. This commonly occurs when the subject of the photograph is either above or below the camera, and the photographer pivots the camera accordingly. Referring to FIG. 1, this type of camera rotation is a rotation of the image plane about an axis parallel to the x-axis. It can be shown that the vanishing point of lines that were parallel to the y-axis in the original scene will always fall on the y-axis of the image when the image plane is rotated about an axis parallel to the x-axis. The object of the present invention is to detect the presence of perspective distortion in an image and to compensate for the same.

Figure 2:
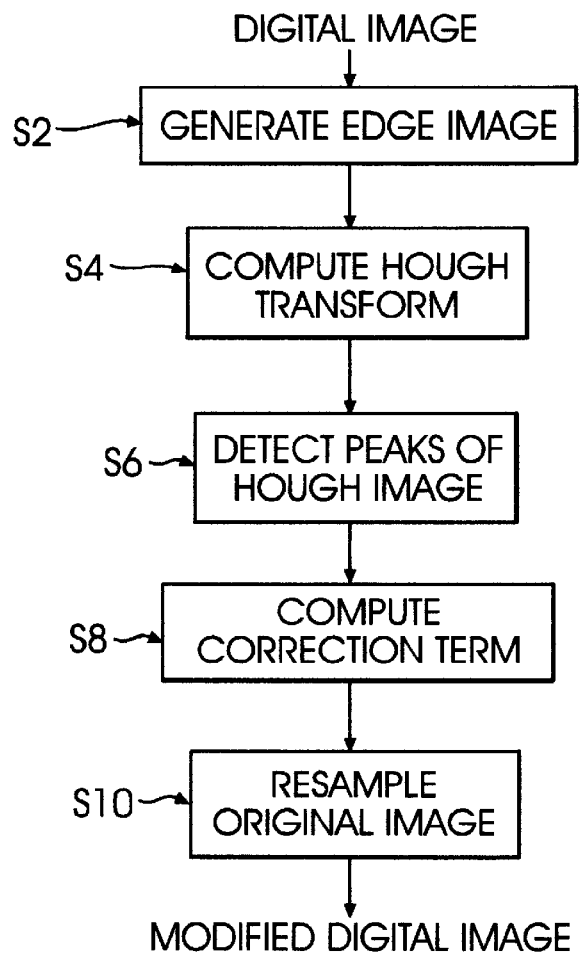
FIG. 2 is a flow diagram illustrating an overview of the present invention.

Referring to FIG. 2, there is shown a flow diagram of the software program of the present invention. The present invention includes five distinct sub-algorithms. Before discussing the present invention, it is instructive to note that the present invention is implemented on a computer, which is well known in the art and need not be discussed in detail herein. Still further, the present invention operates on a digital image; such images, if not already captured in digital form, may be converted to digital form, as is also well known in the art. In this regard, the present invention receives a digital image and creates a binary edge map of the image S2. A Hough transformation is computed S4. The result of the Hough transformation S4 will hereinafter be referred to as a Hough accumulator, and the Hough accumulator is analyzed in later steps for detecting the presence and level of perspective distortion. A Hough accumulator peak detection locates peaks S6 in the Hough accumulator which correspond to lines in image space. The combined purpose of the steps of creating a binary edge map S2, computing a Hough transformation S4, and detecting the peaks of the Hough accumulator S6 is to detect lines in the original digital image. A correction term is computed S8 which estimates the level of perspective distortion based upon the peaks located in the Hough accumulator. The original inputted digital image is then resampled according to the correction term S10 for removing part or all of the perspective distortion.

It facilitates understanding to note that the present invention is described in regard to a digital image having dimensions of 512 pixels by 768 pixels. In addition the digital image is characterized by 12 bits per pixel per color channel. In a typical image, the code values fall in the range of 800–2200. Those skilled in the art will recognize that the preferred embodiment may be adapted to preform significantly the same operation using images of different size and data metric by adjusting constants mentioned in the preferred embodiment.

Figure 4:
FIG. 4 is an example of an edge map.
Figure 3:
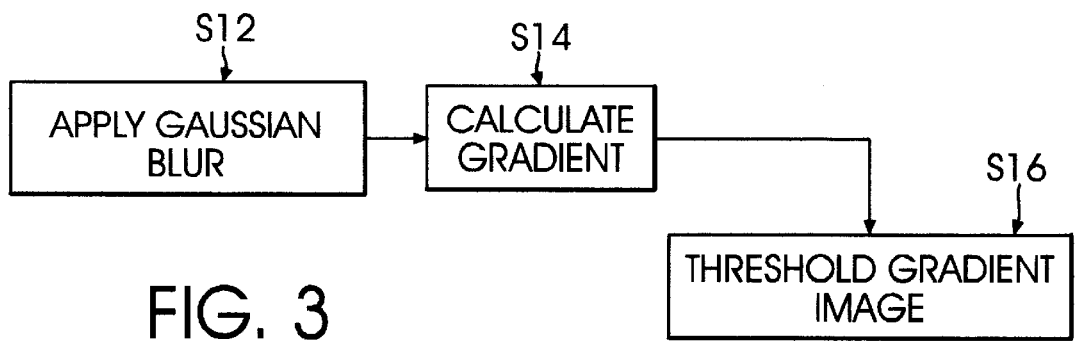
FIG. 3 is a flow diagram illustrating an edge detection method of the present invention.

Referring to FIG. 3, the generation of the edge map is described in detail. In the preferred embodiment, the edge map is formed from the green channel of the original, inputted-digital image. First, the image was lowpass filtered by convolution with a Gaussian filter S12 in order to remove noise. Convolution of an image with a Gaussian filter is well known in the art and will not be further discussed. In the preferred embodiment, the standard deviation of the Gaussian filter is 2 pixels. Next, at each pixel, the non-directional squared gradient of the lowpass filtered image was calculated S14 with the following formula:

$$\nabla_n = \nabla_h^2 + \nabla_v^2 \quad (1)$$

where:

$\nabla_n$=non-directional gradient $\nabla_h$=horizontal gradient $\{x(i,j)-x(i,j+1)\}$ $\nabla_v$=vertical gradient $\{x(i,j)-x(i+1,j)\}$ x(i,j)=the pixel value of the $i^{th}$ row, $j^{th}$ column A threshold, preferably 7500, is then applied S16 to the non-directional squared gradient. If the squared gradient value is greater than the threshold, the pixel is considered an edge pixel and set to 1. Otherwise, the pixel is considered to be a non-edge pixel and set to 0. An example of an edge image (calculated from an image containing perspective distortion) is shown in FIG. 4.

It is instructive to note that alternative edge detection algorithms could be used, as those skilled in the art will be able to compute.

In regard to the step of computing the Hough transform S4, the details of this step are well known in the art and need not be described in detail herein. For example, U.S. Pat. No. 3,069,654 discloses a method for generating the Hough transform. In the preferred embodiment, the polar Hough transform is implemented. The polar Hough transform is described by pages 123–124 in Ballard and Brown in *Computer Vision* (Prentice-Hall, Inc., Englewood Cliffs, N.J., 1982.) In the preferred embodiment, the Hough accumulator generated has the same number of bins as the original image has pixels, although those skilled in the art will recognize that the dimensions of the Hough accumulator may differ from those described in the preferred embodiment without significantly affecting the performance of the present invention. In this case, each bin in the Hough accumulator represents a region of Hough space that is $2\pi$/col radians by 2 pixels of radius, where col represents the number of columns in the image.

In regard to step S6, peaks in the Hough accumulator correspond to lines in the edge image. The Hough accumulator is, therefore, examined for peaks by filtering and thresholding operations. Referring to FIG. 4, the flow diagram for the peak detection is shown. The first stage of the peak detection involves convolving the Hough accumulator with a filter S18. The kernel values used in the filtering process S18 are given by:

$$flt = \begin{bmatrix} 0 & -2 & 0 \\ 1 & 3 & 1 \\ 0 & -2 & 0 \end{bmatrix} \quad (2)$$

The original accumulator is then subtracted from the filtered accumulator S20, in order to generate a difference accumulator corresponding to those regions of the accumulator greatly affected by the filtering process. The next step is to threshold S22 the difference accumulator. If the value at a position in the Hough accumulator is less than the threshold, then the value at that position is set equal to 0. Otheirvise the value is preserved. This process is performed to avoid detection of peaks that are local peaks, but are low in magnitude. In the preferred embodiment, the value of this threshold is 350.

After the threshold operation, the image is then scanned for peaks S24. If the maximum of any window (preferably a 11×11 pixel window, corresponding to a window size of 4.50×10$^{-2}$ radians by 22 pixels of radius) occurs at the center of the window S26, then that pixel is called a peak S28. If not, the pixel is labeled a non-peak S30.

After the peak scanning S24, the peak locations are passed to the peak discriminator S25. The peak discriminator S25 determines which of the detected peaks are of interest to the algorithm. The peak discriminator S25 must determine if a given peak probably does not correspond to a line that was vertical in the original scene. It can be shown that lines that were vertical (parallel to the y-axis) in the original scene will result in image lines that have a common vanishing point falling on a vertical line passing through the center of the image, under the assumption that the scene is captured with an imaging device whose image plane is rotated about the x-axis. Thus, the peak discriminator S25 rejects all peaks for which the following condition is not met:

$$r > \frac{rows}{2}\cos\theta \quad (3)$$

where r and θ refer to the coordinates of the peak in the Hough accumulator, and rows refers to the number of rows contained in the original image.

Because the present invention is concerned with lines that were vertical in the scene, the peak discriminator S25 places a limit on the θ coordinate of the Hough accumulator peaks. In the preferred embodiment, the peak discriminator S25 rejects all peaks for which the following condition is not met:

$$2\pi/5 <= \theta <= 3\pi/5 \quad (4)$$

Peaks not rejected by the peak discriminator S25 are hereafter referred to as accepted peaks.

The equations (3) and (4) represent predetermined criteria on the peaks corresponding to lines in the original image. Only those peaks meeting both of these criteria will be considered as accepted peaks.

The correction factor of step S8 specifies the rate of re-sampling to be performed on the top row of the image. The center row of the image is always preserved, and the degree of re-sampling increases linearly with distance from the center row of the image. The correction factor is calculated in the following manner. A correction factor cf is calculated for each accepted peak, as determined by the peak discriminator S25.

Figure 5:
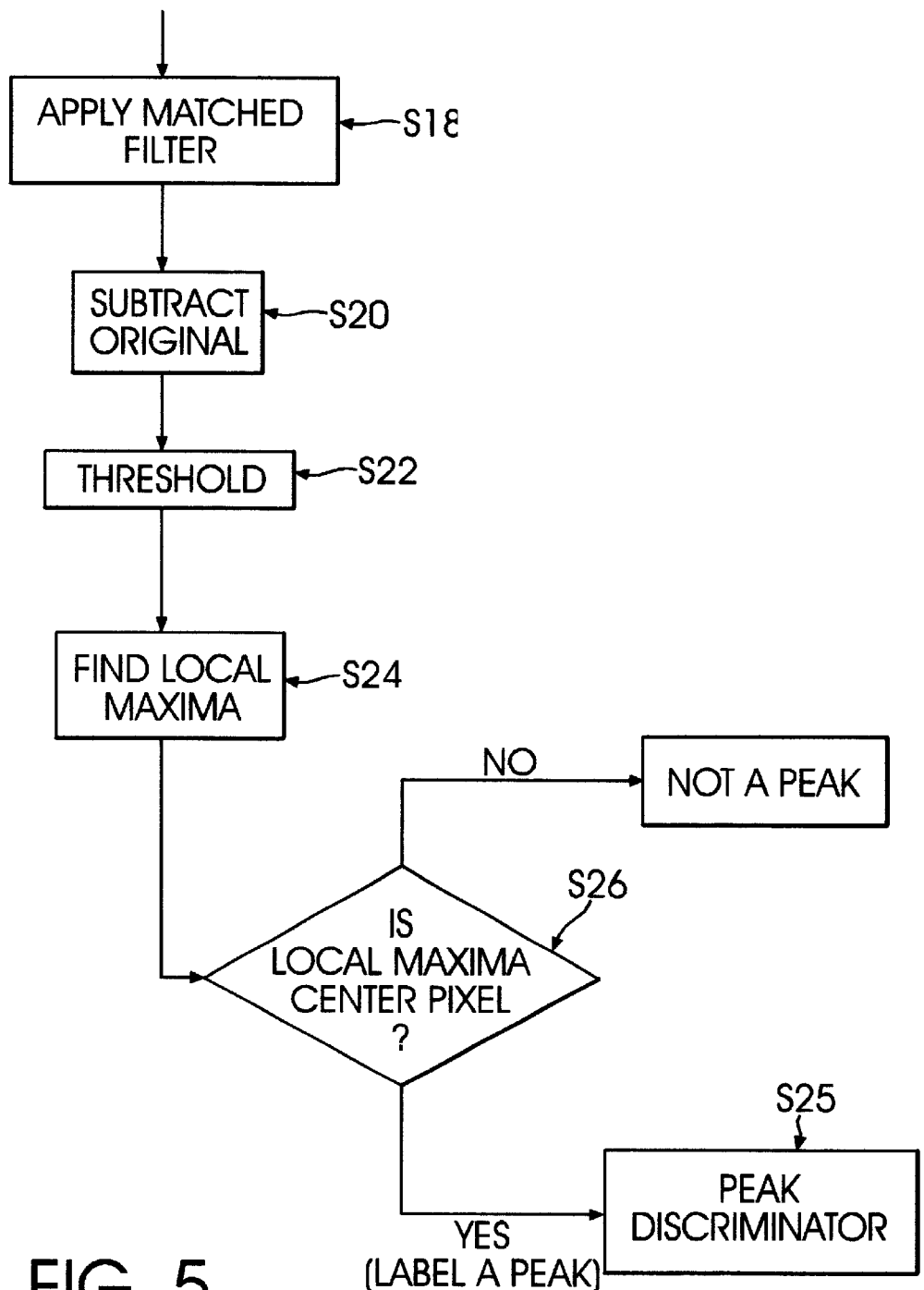
FIG. 5 is detecting peaks of a Hough transform.
Figure 6:
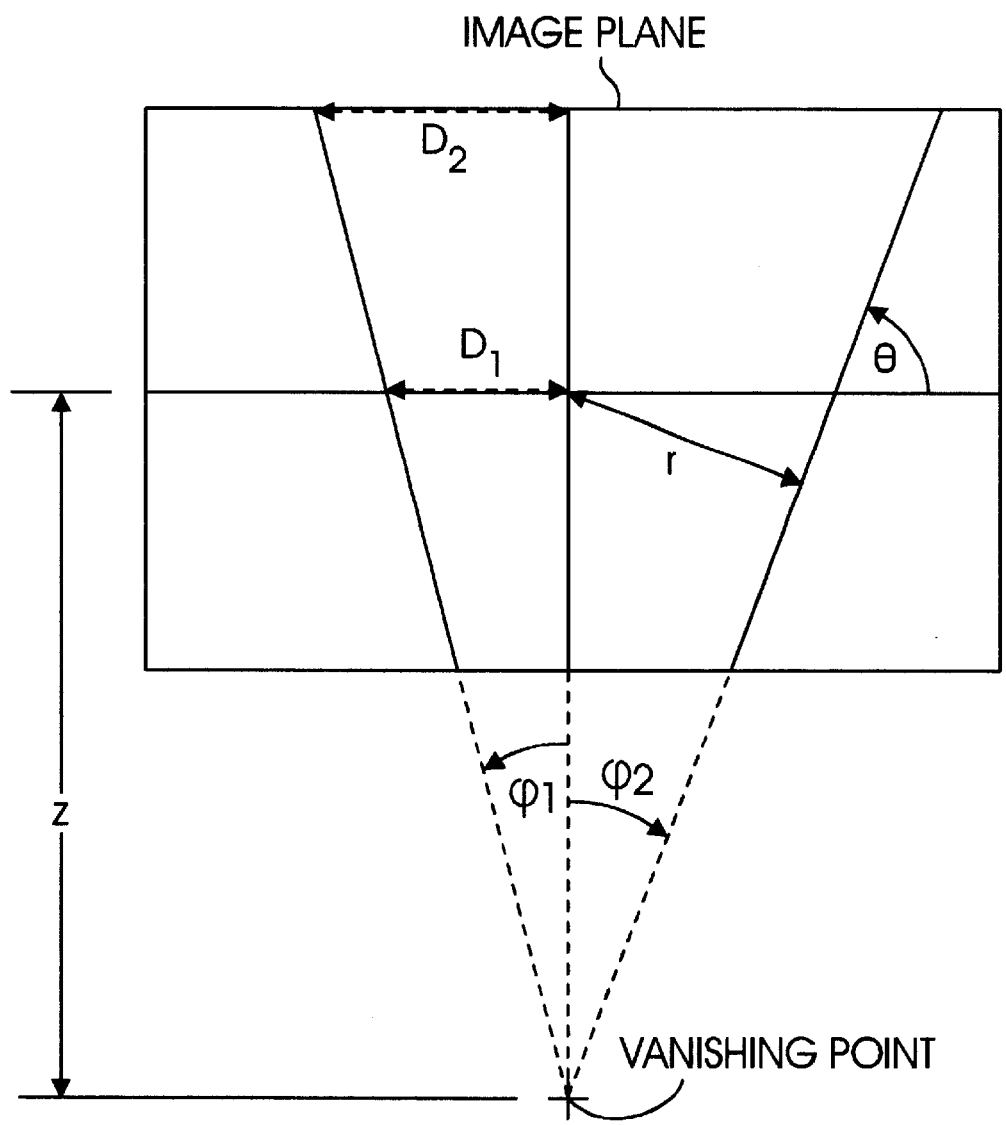
FIG. 6 is a drawing illustrating a correction factor of the present invention.

Referring to FIG. 5, a line in the image corresponding to an accepted peak is identified. Next, the shortest possible distance along the center row from a vertical line passing through the image center to the line corresponding to the accepted peak is calculated (as shown by $D_1$). Then, the distance along the top row from the vertical line passing through the image center to the line corresponding to the accepted peak (as showvn by $D_2$.) is calculated. The correction factor cf is equal to $D_1/D_2$.

As shall be described, warping the image with the given correction factor cf will warp the line corresponding to the accepted peak to be a vertical line parallel to a vertical line passing through the image center, displaced by $D_1$ pixels.

Assuming camera rotation about the x- axis only, all vertical scene lines will be projected to image lines with the same vanishing point falling somewhere on a vertical line passing through the image center. Assuming distance z from the vanishing point to the image center, the correction factor cf of a line corresponding to an accepted peak may also be expressed as:

$$cf = \frac{z\tan\varphi_1}{\left(z+\frac{rows}{2}\right)\tan\varphi_1} = \frac{z}{\left(z+\frac{rows}{2}\right)} \quad (5)$$

The correction factor for image lines having their vanishing point on the vertical axis of the image is dependent upon only the image size and the distance from the vanishing point to the image center. Thus, all lines having a common vanishing point falling on the vertical axis of the image will have a common correction factor cf! This means that all vertical lines in space photographed with a camera rotated about the x-axis only may be forced to the vertical position on the image by a re-sampling process in which the rate of sampling along any row varies linearly with distance from the center row of the image.

A correction factor cf is computed for each valid peak found in the Hough accumulator. A third formula for computing the correction factor cf by knowing the radius r and angle θ of an accepted peak is given by (the sign on radius r is ignored so that geometry may be used):

$$cf = \frac{\frac{|r|}{\sin\theta}}{\frac{|r|}{\sin\theta} - \frac{rows}{2\tan\theta}} = \frac{|r|}{|r| - 0.5 * rows \cdot \cos\theta} \quad (6)$$

In the preferred embodiment this equation is implemented to generate a correction factor cf for each accepted peak. The final correction cf for the entire image is found by computing a weighted average of the coefficient factor of each peak, weighted by the magnitude of the peak. This technique places more importance on peaks in the Hough accumulator that correspond to long lines in the image.

It is instructive to note that selecting the median value is a more robust technique. In addition, a clustering approach may also be used as well (i.e., the correction factor cf for the entire image is selected to be the most common correction factor cf computed among the accepted peaks.) Finally, a minimum number of peaks sharing a common cf may be required before attempting a correction. Any of these variations may be used to achieve the desired results.

The correction factor cf may be modified as desired by implementing the following equation:

$$new\_cf = (cf-1)*a+1 \quad (7)$$

where a is an arbitrary constant. In the preferred embodiment, the value of a is 1.0, therefore new_cf=cf. The constant a may be set between 0 and 1.0 to generate a new_cf that will cause the re-sampling to do a partial correction of the image. After new_cf is calculated, cf is assigned the value of new_cf. The correction term cf constitutes a correction term that will later be used to improve the digital image in order to produce a processed image.

The image re-sampling S10 is designed to warp the image in such a manner as to alter non-vertical lines that are approximately close to being substantially vertical in the image to the substantially vertical position. The image resampling S10 generates a processed image. To generate the processed image, the top row of pixels in the original image is re-sampled at the rate specified by the correction factor cf. The center row of image pixels in the processed image is generated by re-sampling the center row of the original image pixels at the rate of 1.0 (i.e. it is left unchanged.) All other rows are re-sampled a rate which varies linearly according to the distance of the row to the center row of the image.

Described another way, at each location in the processed image there is computed a vector which describes the position to sample from the original image for the purpose of finding a new pixel value. The vector dx which characterizes the difference in position from the processed image pixel location to the original image pixel location is always horizontal position. The equation describing this is:

$$dx = (cf-1) \cdot x \cdot y \cdot \frac{2}{rows} \quad (8)$$

where dx represents the distance from the current pixel location to the position in the original image where a linear interpolation may be performed in order to calculate a pixel value for the current pixel location. x represents the number of pixels from the current pixel location to a vertical line passing through the center of the image, y represents the number of pixels from the current pixel location to a horizontal line passing through the center of the image, and rows represents the number of rows of pixels contained in the image. Those skilled in the art will recognize that preceding method of resampling described in the preferred embodiment may be varied without substantially deviating from the scope of the present invention.

Each pixel in the processed image is filled by using the displacement calculated in (14) in the following manner: At each pixel location (x, y) in the corrected image, the pixel value is calculated by performing a linear interpolation of the two pixels nearest the location (x+dx, y) in the original image. Linear interpolation is well known in the art and will not be further discussed. Those skilled in the art will recognize that other types of interpolation (for instance cubic) may be used to generate the pixel values of the processed image. Pixel locations (x, y) in the processed image may be filled with black pixels if the location (x+dx, y) falls outside of the range of the original image pixel locations. As an alternative, the processed image may the be cropped and zoomed, as is well known in the art, to generate a processed image which no longer contains pixel locations (x, y) if the location (x+dx, y) falls outside of the original image pixel locations.

As a further embodiment, the image may also be resampled in the vertical direction.

As a further alternative embodiment, the computation of the correction factor cf may be preformed on a subsampled version of the original image to save processing time. The correction factor cf calculated by S8 may then be used to control the resampling of the original image S10 for creating a processed image.

The invention has been described with reference to a preferred embodiment. However, it will be appreciated that variations and modifications can be effected by a person of ordinary skill in the art without departing from the scope of the invention.

What is claimed is:

1. A method for modifying an apparent perspective of a digital image representing a perspective projection of a scene, the method comprising the steps of:
   (a) locating a line in the digital image;
   (b) computing a correction term based on parameters of the located line which said correction term is related to the perspective of the digital image relative to the scene; and
   (c) resampling the digital image based on the correction term for creating a processed image.

2. The method of claim 1, wherein step (b) further comprises:
   (b1) calculating the correction term such that when the digital image is resampled in step (c) the located line is substantially vertical in the processed image.

3. The method of claim 2, wherein step (b) further comprises computing a vanishing point for the located line.

4. The method as in claim 3, wherein step (b) further comprises computing the correction term based on the following formula:

$$cf = z/(z+rows/2)$$

where cf is the correction term, z is the distance in pixels between the vanishing point of the located line to the image center, and rows is the number of rows contained in the image being processed.

5. The method as in claim 3, wherein step (b) further comprises computing the correction term based on the following formula:

$$cf = |r|/(|r| - 0.5\ rows * \cos\theta)$$

where cf is the correction term, r is the shortest distance in pixels between the located line to the image center, $\theta$ is the angle of the located line with respect to the horizontal, and rows is the number of rows contained in the image being processed.

6. The method as in claim 1, wherein step (a) further comprises the steps of:
   (a1) generating an edge image from the digital image
   (a2) computing a Hough transform of the edge image; and
   (a3) detecting peaks of a Hough accumulator; and
   (a4) identifying the peaks of the Hough accumulator which correspond to a located line in the digital image.

7. The method as in claim 6, wherein step (a1) further comprises the steps of:
   (a11) blurring the digital image with a digital filter;
   (a12) calculating a gradient of the blurred digital image; and
   (a13) applying a threshold to the gradient of the blurred digital image for producing the edge image.

8. The method as in claim 6, wherein step (a3) further comprises the steps:
   (a31) filtering the Hough accumulator with a matched filter;
   (a32) generating a difference accumulator with the filtered Hough accumulator and the Hough accumulator;
   (a32) applying a threshold to the difference accumulator creating a peak image;
   (a33) identifying local maximum values of the peak image; and
   (a34) if the local maximum is nonzero and equal to the value of the peak image at any particular location, identifying that location as a peak value.

9. The method as in claim 6, wherein step (a4) further comprises the steps of:
   (a41) identifying those peak values of step (a3) that correspond to located lines.

10. The method as in claim 1, wherein step (c) further comprises the steps of:
    (c1) re-sampling a row of pixels of the digital image such that the rate of interpolation is dependent on the correction term, and a position of the row of pixels with respect to the central row of pixels; and (c2) repeating step (c1) for all the other rows of pixels.

11. A method for modifying a perspective of a digital image, the method comprising the steps of:
    (a) subsampling the digital image;
    (b) locating a line in the sub-sampled digital image;
    (c) computing a correction term based on parameters of the located line which said correction term is related to the perspective of the digital image relative to the scene; and
    (d) resampling the digital image based on the correction term for creating a processed image.

12. A computer program product for modifying an apparent perspective of a digital image representing a perspective projection of a scene, comprising: a computer readable storage medium having a computer program stored thereon for performing the steps of:
    (a) locating a line in the digital image;
    (b) computing a correction term based on parameters of the located line which said correction term is related to the perspective of the digital image relative to the scene; and
    (c) resampling the digital image based on the correction term for creating a processed image.

13. The computer program product of claim 12, wherein step (b) further comprises:
    (b1) calculating the correction term such that when the digital image is resampled in step (c) the located line is substantially vertical in the processed image.

14. The computer program product of claim 13, wherein step (b) further comprises computing a vanishing point for the located line.

15. The computer program product as in claim 14, wherein step (b) further comprises computing the correction term based on the following formula:

$$cf = z/(z+rows/2)$$

where cf is the correction term, z is the distance in pixels between the vanishing point of the located line to the image center, and rows is the number of rows contained in the image being processed.

16. The computer program product as in claim 14, wherein step (b) further comprises computing the correction term based on the following formula:

$$cf = |r|/(|r| - 0.5\ rows * \cos\theta)$$

where cf is the correction term, r is the shortest distance in pixels between the located line to the image center, $\theta$ is the angle of the located line with respect to the horizontal, and rows is the number of rows contained in the image being processed.

17. The computer program product as in claim 12, wherein step (a) further comprises:
   (a1) generating an edge image from the digital image
   (a2) computing a Hough transform of the edge image; and
   (a3) detecting peaks of a Hough accumulator; and
   (a4) identifying the peaks of the Hough accumulator which correspond to a located line in the digital image.

18. The computer program product as in claim 17, wherein step (a1) further comprises the steps of:
   (a11) blurring the digital image with a digital filter;
   (a12) calculating a gradient of the blurred digital image; and
   (a13) applying a threshold to the gradient of the blurred digital image for producing the edge image.

19. The computer program product as in claim 17, wherein step (a3) further comprises the steps:
   (a31) filtering the Hough accumulator with a matched filter;
   (a32) generating a difference accumulator with the filtered Hough accumulator and the Hough accumulator;
   (a32) applying a threshold to the difference accumulator creating a peak image;
   (a33) identifying local maximum values of the peak image; and
   (a34) if the local maximum is nonzero and equal to the value of the peak image at any particular location, identifying that location as a peak value.

20. The computer program product as in claim 17, wherein step (a4) further comprises the steps of:
   (a41) identifying those peak values of step (a3) that correspond to located lines.

21. The computer program product as in claim 13, wherein the re-sampling means further comprises:
   (c1) means for re-sampling a row of pixels of the digital image such that the rate of interpolation is dependent on the correction term, and a position of the row of pixels with respect to the central row of pixels; and (c2) means for repeating the means (c1) for all the other rows of pixels.

22. A system for modifying an apparent perspective of a digital image representing a perspective projection of a scene, the system comprising:
   (a) means for locating a line in the digital image;
   (b) means for computing a correction term based on parameters of the located line which said correction term is related to the perspective of the digital image relative to the scene; and
   (c) means for resampling the digital image based on the correction term for creating a processed image.

23. The system of claim 22, wherein the computing means further comprises:
   (b1) the calculating means includes the correction term such that when the digital image is resampled in step (c) the located line is substantially vertical in the processed image.

24. The system of claim 23, wherein the calculating means further comprises means for computing a vanishing point for the located line.

25. The system as in claim 24, wherein the calculating means further comprises means for computing the correction term based on the following formula:

$$cf = z/(z + rows/2)$$

where cf is the correction term, z is the distance in pixels between the vanishing point of the located line to the image center, and rows is the number of rows contained in the image being processed.

26. The system as in claim 24, wherein the calculating means further comprises computing the correction term based on the following formula:

$$cf = |r|/(|r| - 0.5 \; rows * \cos \theta)$$

where cf is the correction term, r is the shortest distance in pixels between the located line to the image center, θ is the angle of the located line with respect to the horizontal, and rows is the number of rows contained in the image being processed.

27. The system as in claim 22, wherein step (a) further comprises:
   (a1) means for generating an edge image from the digital image
   (a2) means for computing a Hough transform of the edge image; and
   (a3) means for detecting peaks of a Hough accumulator; and
   (a4) means for identifying the peaks of the Hough accumulator which correspond to a located line in the digital image.

28. The system as in claim 27, wherein the generating means further comprises the steps of:
   (a11) blurring the digital image with a digital filter;
   (a12) calculating a gradient of the blurred digital image; and
   (a13) applying a threshold to the gradient of the blurred digital image for producing the edge image.

29. The system as in claim 27, wherein the detecting means further comprises:
   (a31) means for filtering the Hough accumulator with a matched filter;
   (a32) means for generating a difference accumulator with the filtered Hough accumulator and the Hough accumulator;
   (a32) means for applying a threshold to the difference accumulator creating a peak image;
   (a33) means for identifying local maximum values of the peak image; and
   (a34) if the local maximum is nonzero and equal to the value of the peak image at any particular location, means for identifying that location as a peak value.

30. The system as in claim 27, wherein the identifying means further comprises:
   (a41) means for identifying those peak values of step (a3) that correspond to located lines.

31. The system as in claim 22, wherein step (c) further comprises:
   (c1) means for re-sampling a row of pixels of the digital image such that the rate of interpolation is dependent on the correction term, and a position of the row of pixels with respect to the central row of pixels; and
   (c2) repeating the means (c1) for all the other rows of pixels.

* * * * *